United States Patent
Koh

(10) Patent No.: US 7,812,836 B2
(45) Date of Patent: Oct. 12, 2010

(54) DISPLAY APPARATUS AND POWER CONTROL METHOD THEREOF

(75) Inventor: Hyung-il Koh, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 779 days.

(21) Appl. No.: 11/638,553

(22) Filed: Dec. 14, 2006

(65) Prior Publication Data
US 2007/0152994 A1    Jul. 5, 2007

(30) Foreign Application Priority Data
Jan. 5, 2006    (KR) ...................... 10-2006-0001404

(51) Int. Cl.
*G09G 5/00*    (2006.01)
*G06F 3/038*    (2006.01)
(52) U.S. Cl. .................. 345/213; 713/322; 348/730
(58) Field of Classification Search ........... 345/87–102, 345/204–213, 690–699, 76, 82, 163; 348/730; 713/322, 300–340, 500
See application file for complete search history.

(56) References Cited
U.S. PATENT DOCUMENTS
6,020,879 A * 2/2000 Nakabayashi ............... 345/212
6,587,101 B2    7/2003 Yoo
2002/0060676 A1* 5/2002 Kim ............................ 345/212
2002/0126094 A1* 9/2002 Junod et al. ................. 345/163
2005/0104837 A1* 5/2005 Baik et al. .................... 345/99

FOREIGN PATENT DOCUMENTS
| JP | 10-105132 A | 4/1998 |
|---|---|---|
| KR | 10-2001-0081266 A | 8/2001 |
| KR | 10-2002-0025543 A | 4/2002 |
| KR | 10-2003-0020494 A | 3/2003 |
| KR | 10-2004-0090161 A | 10/2004 |

* cited by examiner

*Primary Examiner*—Stephen G Sherman
(74) *Attorney, Agent, or Firm*—Sughrue Mion, PLLC

(57) ABSTRACT

A display apparatus and a power control method thereof are provided. The display apparatus includes a power supplying part; a Transition Minimized Differential Signaling (TMDS) receiving part which decodes a TMDS signal input from an external signal source; a controller which controls the power supplying part to supply driving power to the TMDS receiving part when a clock signal of the TMDS signal is received. The power control method includes cutting off driving power to a Transition Minimized Differential Signaling (TMDS) receiving part when the display apparatus enters a power-saving mode; determining whether a clock signal is detected in a TMDS signal; and supplying driving power to the TMDS receiving part if it is determined that the clock signal is detected.

13 Claims, 3 Drawing Sheets

DISPLAY APPARATUS AND POWER CONTROL METHOD THEREOF

CROSS-REFERENCE TO RELATED APPLICATIONS

This application claims priority from Korean Patent Application No. 10-2006-0001404, filed on Jan. 5, 2006, the disclosure of which is incorporated herein by reference in its entirety.

BACKGROUND OF THE INVENTION

1. Field of the Invention

Apparatuses and methods consistent with the present invention relate to a display apparatus having a Transition Minimized Differential Signaling (TMDS) receiver that receives and decodes a signal of a TMDS format, which is a digital signal, and a power control method thereof.

2. Description of the Related Art

A TMDS signal, which is a kind of digital video signal, is input from a signal source, such as a computer or the like, to a TMDS receiver of a display apparatus through a Digital Video Interface (DVI) or a High Definition Multimedia Interface (HDMI). The TMDS receiver decodes the received TMDS signal into a signal of a format which can be processed by the display apparatus.

A related art display apparatus having such a TMDS receiver enters a power-saving mode of a Display Power Management System (DPMS) if a synchronization signal output from the TMDS receiver is not detected.

However, since such a related art display apparatus may or may not enter the power-saving mode depending on whether or not the synchronization signal from the TMDS receiver is detected, standby power has to be supplied to the TMDS receiver in order to detect the synchronization signal in the power-saving mode. In this case, the TMDS receiver consumes a current of about 700 mA which increases the standby power consumption of the whole TMDS receiver.

SUMMARY OF THE INVENTION

Accordingly, it is an aspect of the present invention to provide a display apparatus, which is capable of determining the presence of a TMDS signal through a clock signal detecting part before the TMDS signal is input to a TMDS receiving part, thereby reducing standby power consumption by stopping supply of power to the TMDS receiving part in a standby mode, and reducing loss of the clock signal, which may occur due to branch from a clock line, when the TMDS signal is detected, and a power control method thereof.

These and other aspects of the present invention can be achieved by providing a display apparatus comprising a power supplying part; a Transition Minimized Differential Signaling (TMDS) receiving part which decodes a TMDS signal input from an external signal source; a controller which controls the power supplying part to supply driving power to the TMDS receiving part if a clock signal of the TMDS signal is received.

According to an exemplary embodiment of the present invention, the display apparatus further comprises a clock signal detecting part which detects whether the clock signal is input and outputs the detected clock signal, wherein the controller controls the power supplying part to supply driving power to the TMDS receiving part based on the detected clock signal.

According to an exemplary embodiment of the present invention, the display apparatus further comprises a switching part which controls the clock signal which is input to the clock signal detecting part, wherein the controller outputs a control signal to interrupt input of the clock signal to the clock signal detecting part by turning off the switching part when the clock signal is detected by the clock signal detecting part.

According to an exemplary embodiment of the present invention, the controller controls the power supplying part to interrupt supply of the driving power to the TMDS receiving part and switches on the switching part when the display apparatus enters a power-saving mode.

According to an exemplary embodiment of the present invention, the clock signal detecting part comprises a low pass filter which filters out a low frequency component of the clock signal input through the switching part, and a comparator which compares a signal output from the low pass filter with a reference signal and outputs a detection signal related to the clock signal.

According to an exemplary embodiment of the present invention, the controller determines whether the clock signal is detected, based on a level of the detection signal output from the comparator.

According to an exemplary embodiment of the present invention, the display apparatus further comprises: a displaying part which displays a video; and a signal processing part which processes the TMDS signal decoded by the TMDS receiving part to conform to an output format of the displaying part and outputs the processed TMDS signal to the displaying part.

According to an exemplary embodiment of the present invention, the controller controls the power supplying part to supply driving power to the signal processing part and the displaying part when the clock signal is detected by the clock signal detecting part.

According to an exemplary embodiment of the present invention, the signal processing part comprises a scaler which scales the TMDS signal decoded by the TMDS receiving part to conform to the output format of the displaying part, and a picture quality enhancer which enhances a quality of the scaled TMDS signal.

According to an exemplary embodiment of the present invention, the clock signal detecting part comprises a low pass filter which filters out a low frequency component of the clock signal input through the switching part, and a comparator which compares a signal output from the low pass filter with a reference signal and outputs a detection signal related to the clock signal.

According to an exemplary embodiment of the present invention, the controller determines whether the clock signal is detected, based on a level of the detection signal output from the comparator.

According to an exemplary embodiment of the present invention, the display apparatus further comprises: a displaying part which displays a video; and a signal processing part which processes the TMDS signal decoded by the TMDS receiving part to conform to an output format of the displaying part and outputs the processed TMDS signal to the displaying part.

According to an exemplary embodiment of the present invention, the controller controls the power supplying part to supply driving power to the signal processing part and the displaying part if the clock signal is detected by the clock signal detecting part.

According to an exemplary embodiment of the present invention, the signal processing part comprises a scaler which scales the TMDS signal decoded by the TMDS receiving part to conform to the output format of the displaying part, and a picture quality enhancer which enhances a quality of the scaled TMDS signal.

According to an exemplary embodiment of the present invention, the display apparatus further comprises a switching part which controls the clock signal which is input to the clock signal detecting part, wherein the controller detects a synchronization signal output from the TMDS receiving part and switches off the switching part when the synchronization signal is detected.

These and other aspects of the present invention may also be achieved by providing a power control method of a display apparatus having a power supplying part, the power control method comprising cutting off driving power to a Transition Minimized Differential Signaling (TMDS) receiving part when the display apparatus enters a power-saving mode; determining whether a clock signal is detected; and supplying driving power to the TMDS receiving part if it is determined that the clock signal is detected.

According to an exemplary embodiment of the present invention, the power control method further comprises switching on a switching part if the display apparatus enters the power-saving mode and switching off the switching part when it is determined that the clock signal is detected.

According to an exemplary embodiment of the present invention, the power control method further comprises detecting a synchronization signal wherein the switching part is switched off if the synchronization signal is detected.

According to an exemplary embodiment of the present invention, the power control method further comprises supplying driving power to a signal processing part and a displaying part if the clock signal is detected.

According to an exemplary embodiment of the present invention, the power control method further comprises supplying driving power to a signal processing part and a displaying part if the clock signal is detected.

BRIEF DESCRIPTION OF THE DRAWINGS

The above and other aspects of the present invention will become apparent and more readily appreciated from the following description of the exemplary embodiments, taken in conjunction with the accompanying drawings of which.

DETAILED DESCRIPTION OF EXEMPLARY EMBODIMENTS OF THE PRESENT INVENTION

Reference will now be made in detail to exemplary embodiments of the present invention, examples of which are illustrated in the accompanying drawings.

Figure 1:
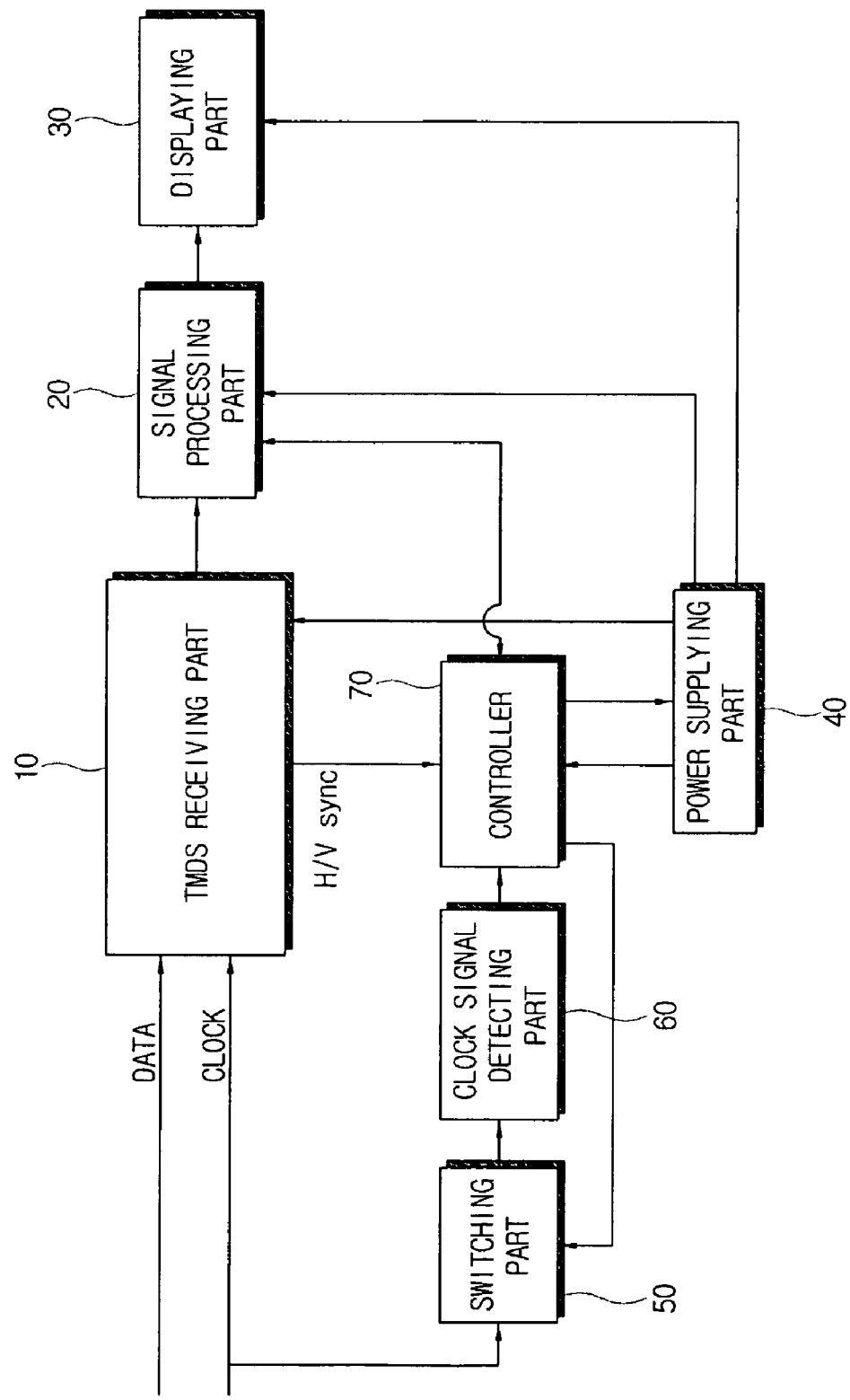
FIG. 1 is a control block diagram of a display apparatus according to an exemplary embodiment of the present invention.

FIG. 1 is a control block diagram of a display apparatus according to an exemplary embodiment of the present invention.

Referring to FIG. 1, a display apparatus according to an exemplary embodiment of the present invention comprises a TMDS receiving part 10, a signal processing part 20, a displaying part 30, a power supplying part 40, a switching part 50, a clock signal detecting part 60 and a controller 70.

The TMDS receiving part 10 decodes a TMDS signal received from an external signal source to conform to the process standard of the signal processing part 20. The TMDS receiving part 10 may comprise a decoder. The TMDS signal, which is a digital signal, may have a DVI or HDMI format. Specifically, when the external signal source transmits high-speed serial data into which parallel data are modulated, the TMDS receiving part 10 receives and demodulates the transmitted serial data.

For example, in the case of HDMI format, video, audio and control signals, in a state of being encoded with a TMDS format, are input from the external signal source to the TMDS receiving part 10 in four channels, including R, G and B channels and a clock channel. The TMDS receiving part 10 decodes and separates input signals into R, G and B video signals, an audio signal and a synchronization signal. In addition, the TMDS receiving part 10 may further comprise an authentication module for High-bandwidth Digital Content Protection (HDCP) authentication.

The signal processing part 20 processes a video signal decoded in the TMDS receiving part 10 to conform to an output format of the displaying part 30. For example, the signal processing part 20 may comprise a scaling function to scale a vertical frequency, a resolution, a picture ratio, etc. of an input digital video signal in compliance with the output format of the displaying part 30, and a picture quality enhancing function.

In this exemplary embodiment, the displaying part 30 may be applicable to various types of display modules such as a Digital Light Processing (DLP) module, a Liquid Crystal Display (LCD) module, a Plasma Display Panel (PDP) module, or the like.

The power supplying part 40 supplies standby power to the controller 70, which will be described later, and also supplies power to the TMDS receiving part 10, the signal processing part 20 and the displaying part 30 under control of the controller 70, which will be described later.

The switching part 50 is coupled to a signal line branched from a clock signal input line coupled from the external signal source to the TMDS receiving part 10, as shown in FIG. 1. The switching part 50 may comprise a switching element for controlling a clock signal by switching on/off under control of the controller 70, which will be described later.

The clock signal detecting part 60 is coupled to the switching part 50 for detecting the clock signal and outputting the detected signal to the controller 70, which will be described later. The clock signal detecting part 60 may be embodied by a detection circuit designed to include resistors, capacitors, transistors, or the like.

The controller 70 controls the switching part 50 and the power supplying part 40 based on the result of the detection of the clock signal detecting part 60. The controller 70 may be embodied by a microcomputer, a Central Processing Unit (CPU), a Micro Controller Unit (MCU), or similar device. In addition, the controller 70 may check and change setting values related to operation conditions of the signal processing part 20 through I2C communication with the signal processing part 20 and control the operation of the signal processing part 20.

Specifically, when it is determined on the basis of the detecting signal of the clock signal detecting part 60 that the clock signal is detected, the controller 70 controls the power supplying part 40 to operate in a normal mode, that is, to apply a control signal for supplying driving power to the TMDS receiving part 10, the signal processing part 20 and the displaying part 30. Also, the controller 70 switches off the switching part 50 to prevent the clock signal from being branched from the clock signal input line, that is, from being lost or weakened. This is for normal signal process of the TMDS receiving part 10 and the signal processing part 20, considering that the clock signal has a relatively low level.

When the controller 70 detects whether a synchronization signal is output from the TMDS receiving part 10 and the synchronization signal is detected, the controller 70 controls the switching part 50 to be switched off. This is for controlling the switching part 50 more stably through determination of whether or not a digital signal is normally input.

In addition, in a power-saving mode, the controller 70 cuts off power supply to the TMDS receiving part 10 and determines whether or not the TMDS signal is received from the external signal source by switching on the switching part 50.

Hereinafter, a display apparatus according to another exemplary embodiment of the present invention will be described with reference to FIG. 2. In this exemplary embodiment, the same elements as the above-described exemplary embodiment are denoted by the same reference numerals, and description of which will be omitted.

Figure 2:
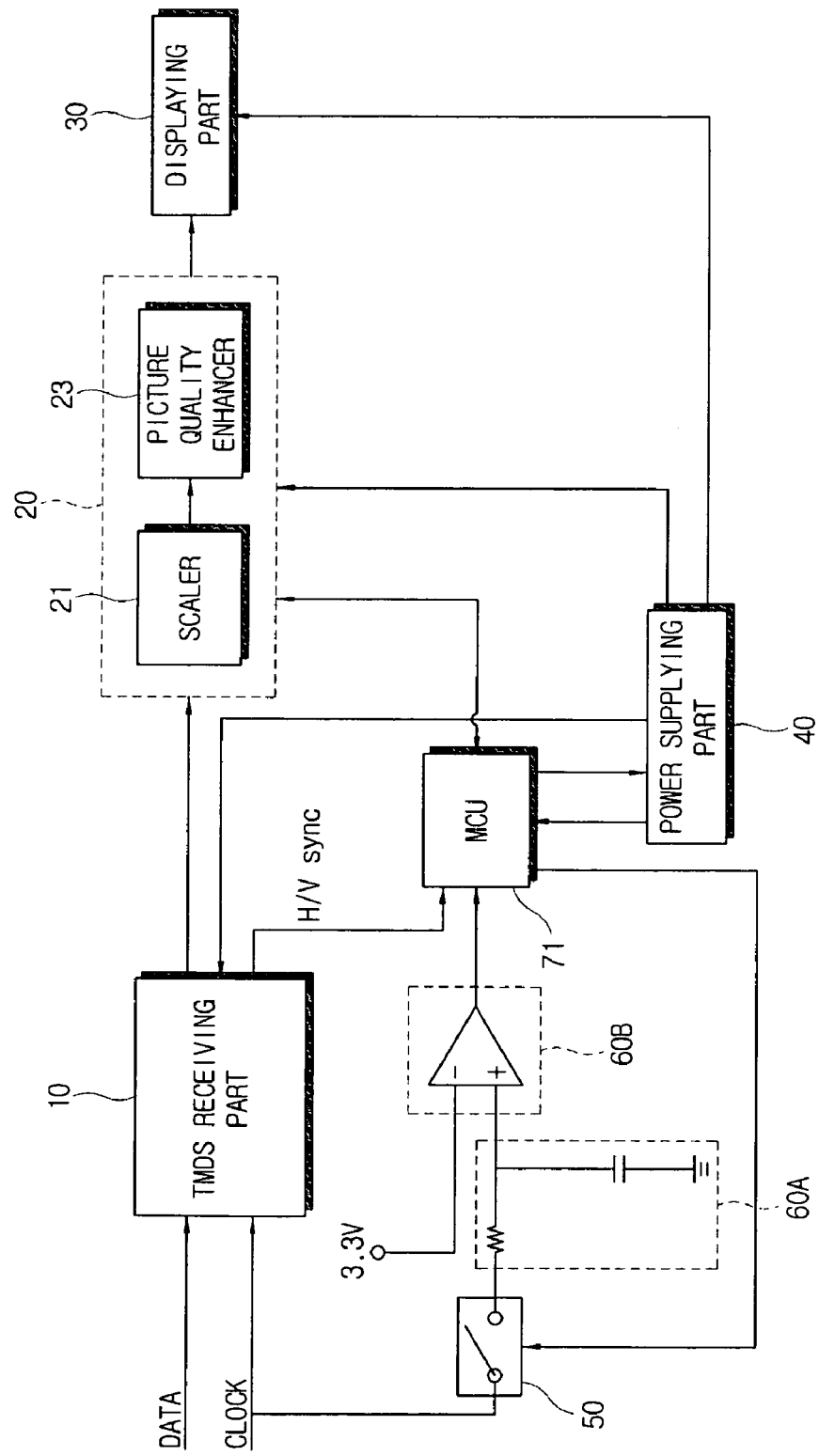
FIG. 2 is a control block diagram of a display apparatus according to another exemplary embodiment of the present invention.

As shown in FIG. 2, an display apparatus according to another exemplary embodiment of the present invention comprises a TMDS receiving part 10, a scaler 21, a picture quality enhancer 23, a displaying part 30, a power supplying part 40, a switching part 50, a low pass filter 60A, a comparator 60B and a MCU 71.

In a power-saving mode, the power supplying part 40 supplies power to the MCU 71 alone and stops power supply to the other elements including the TMDS receiving part 10. The MCU 71 applies a switching control signal to the switching part 50 so that the switching part 50 is switched on in the power-saving mode.

When a TMDS signal is input from an external signal source to the TMDS receiving part 10 through a data line and a clock line, a TMDS clock signal is input to the switching part 50 coupled to the clock line. The switching part 50 provides the input TMDS clock signal to the low pass filter 60A.

The low pass filter 60A filters out a low frequency component of the clock signal provided from the switching part 50 and outputs a filtered signal to the comparator 60B. The comparator 60B outputs a detection signal, which is the multiplication of a difference between the filtered signal input from the low pass filter 60A and a reference signal (for example, a 3.3 V signal) by a gain, to the MCU 71. The gain may be predetermined. When a certain level of signal is filtered and output from the low pass filter 60A, a high level signal is output from the comparator 60B, and when no signal is detected, a low level signal is output from the comparator 60B. The certain level may be predetermined.

When the MCU 71 determines that the TMDS signal is input, the MCU 71 applies a control signal to the power supplying part 40 and controls the power supplying part 40 to supply power to other elements including the TMDS receiving part 10 in a normal mode.

The TMDS receiving part 10 supplied with the power decodes the received TMDS signal and separates the decoded TMDS signal into an RGB video signal and a synchronization signal. Resolution and picture size of the RGB video signal are scaled to conform to an output format of the displaying part 30 by the scaler 21. Then, the picture quality enhancer 23 enhances a quality of the scaled video signal to be output to the displaying part 30. Accordingly, a user can view a video displayed on the displaying part 30. The MCU 71 may check and change setting values related to operation conditions of the scaler 21 through I2C communication with the scaler 21 and control the operation of the scaler 21.

Figure 3:
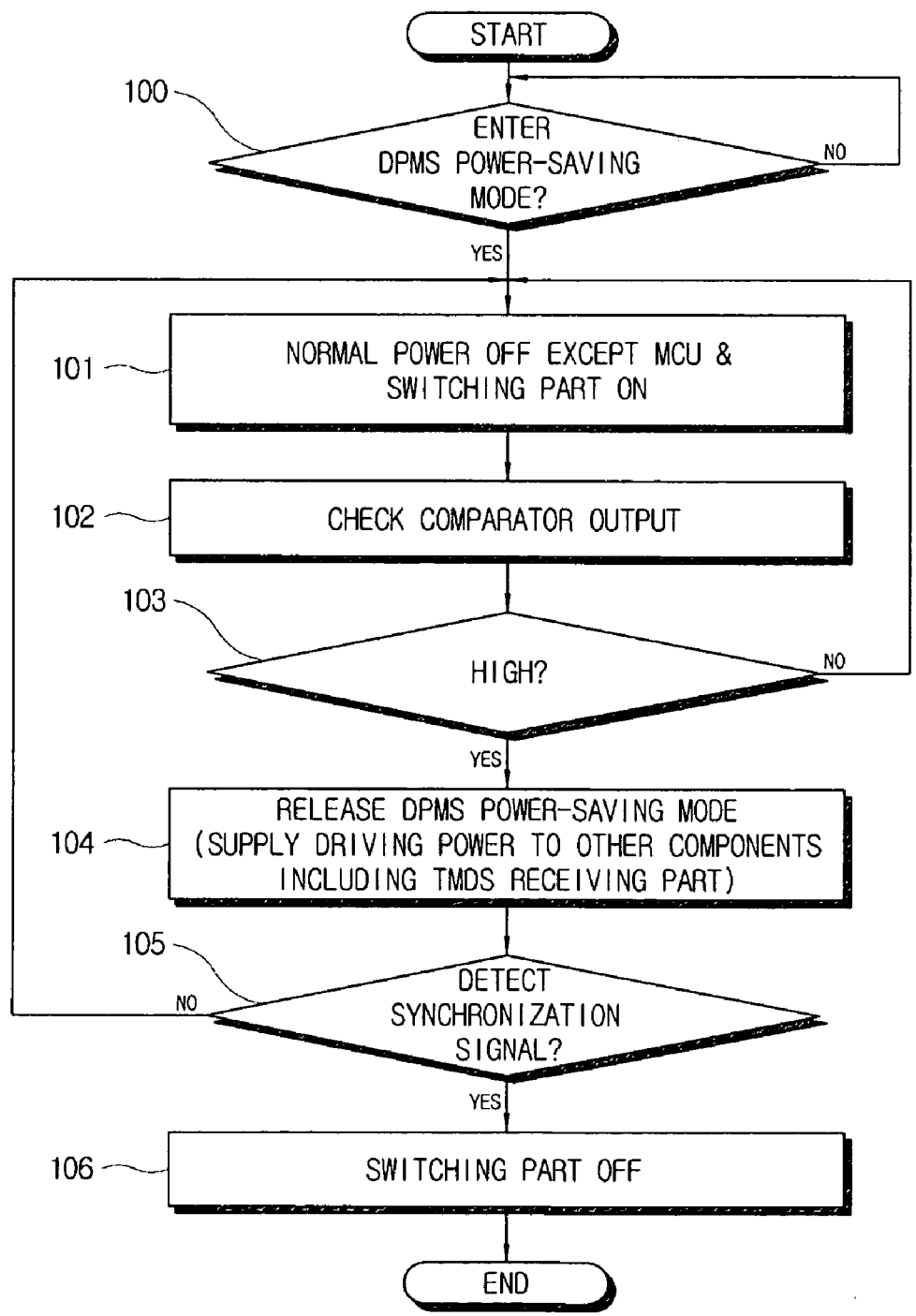
FIG. 3 is a control flow chart illustrating an operation of the display apparatus according to another exemplary embodiment of the present invention.

Hereinafter, an exemplary embodiment of a control method of the display apparatus shown in FIG. 2 will be described with reference to FIG. 3.

When the display apparatus enters a DPMS power-saving mode at operation 100, the MCU 71 controls the power supplying part 40 not to supply power to other elements including the TMDS receiving part 10 at operation 101. In other words, in the power-saving mode, standby power is supplied to the MCU 71 alone. Also, the MCU 71 switches on the switching part 50 so that a clock signal output from a signal line branched from the clock line is supplied to the clock signal detecting part 60 at the operation 101.

In the power-saving mode, the MCU 71 checks an output of the comparator 60B at operation 102. If it is determined that a high level signal is output from the comparator 60B at operation 103, the MCU 71 determines that a TMDS signal is received, releases the display apparatus from the power-saving mode and then controls the power supplying part 40 to supply driving power to other elements including the TMDS receiving part 10 at operation 104.

The MCU 71 determines whether or not the synchronization signal is detected from the TMDS signal processed by the TMDS receiving part 10 at operation 105. If it is determined that the synchronization signal is detected, the MCU 71 switches off the switching part 50 so that the clock signal output from the signal line branched from the clock line is input to the TMDS receiving part 10 at a normal level at operation 106. Thus, the TMDS receiving part 10 can receive and process the clock signal of the normal level.

In other words, by switching the switching part 50 from an on-state to an off-state when the TMDS signal is input to the TMDS receiving part 10, the clock signal input to the TMDS receiving part 10 can be prevented from being lost or deteriorated because of the additional drain of the switching part 50 and the low pass filter 60A and the comparator 60B.

As apparent from the above description, exemplary embodiments of the present invention provide a display apparatus, which is capable of determining the presence of a TMDS signal through a clock signal detecting part before the TMDS signal is input to a TMDS receiving part, reducing standby power consumption by stopping supply of power to the TMDS receiving part in a standby mode, and reducing loss of the clock signal, which may occur due to branch from a clock line, when the TMDS signal is detected, and a power control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a power supplying part;
a Transition Minimized Differential Signaling (TMDS) receiving part which decodes a TMDS signal input from an external signal source;
a controller which controls the power supplying part to supply driving power to the TMDS receiving part when a TMDS clock signal of the TMDS signal is received;
a clock signal detecting part which detects whether a clock signal is input and outputs a detection signal related to the clock signal, the detection signal output to the controller; and a switching part which controls the clock signal which is input to the clock signal detecting part, wherein the controller determines whether the clock signal is the TMDS clock signal based on the detection signal, and in response to the controller determining that the clock signal is the TMDS clock signal, the controller controls the power supplying part to supply the driving power to the TMDS receiving part, and wherein the TMDS receiving part, in response to the supplied driving power, outputs a signal to the controller, and if the controller determines that the output signal is a synchronization signal from the TMDS receiving part, the controller switches off the switching part.

2. The display apparatus according to claim 1, wherein the controller controls the power supplying part to interrupt supply of the driving power to the TMDS receiving part and switches on the switching part when the display apparatus enters a power-saving mode.

3. The display apparatus according to claim 2, further comprising:

a displaying part which displays a video; and a signal processing part which processes the TMDS signal decoded by the TMDS receiving part to conform to an output format of the displaying part and outputs the processed TMDS signal to the displaying part.

4. The display apparatus according to claim 3, wherein the controller controls the power supplying part to supply driving power to the signal processing part and the displaying part when the clock signal is determined as the TMDS clock signal by controller.

5. The display apparatus according to claim 4, wherein the signal processing part comprises:

a scaler which scales the TMDS signal decoded by the TMDS receiving part to conform to the output format of the displaying part; and a picture quality enhancer which enhances a quality of the scaled TMDS signal.

6. The display apparatus according to claim 1, further comprising:

a displaying part which displays a video; and a signal processing part which processes the TMDS signal decoded by the TMDS receiving part to conform to an output format of the displaying part and outputs the processed TMDS signal to the displaying part.

7. The display apparatus according to claim 6, wherein the controller controls the power supplying part to supply driving power to the signal processing part and the displaying part when the clock signal is determined as the TMDS clock signal by controller.

8. The display apparatus according to claim 7, wherein the signal processing part comprises:

a scaler which scales the TMDS signal decoded by the TMDS receiving part to conform to the output format of the displaying part; and a picture quality enhancer which enhances a quality of the scaled TMDS signal.

9. A display apparatus comprising:

a power supplying part a Transition Minimized Differential Signaling (TMDS) receiving part which decodes a TMDS signal input from an external signal source;

a controller which controls the power supplying part to supply driving power to the TMDS receiving part when a clock signal of the TMDS signal is received;

a clock signal detecting part which detects whether the clock signal is input and outputs a detection signal related to the clock signal; and a switching part which controls the clock signal which is input to the clock signal detecting part, wherein the controller controls the power supplying part to supply driving power to the TMDS receiving part based on the detection signal, and wherein the controller outputs a control signal to interrupt input of the clock signal to the clock signal detecting part by turning off the switching part when the clock signal is detected by the clock signal detecting part, wherein the clock signal detecting part comprises:

a low pass filter which filters out a low frequency component of the clock signal input through the switching part; and a comparator which compares a signal output from the low pass filter with a reference signal and outputs the detection signal related to the clock signal.

10. The display apparatus according to claim 9, wherein the controller determines whether the clock signal is detected based on a level of the detection signal output from the comparator.

11. The display apparatus according to claim 9, wherein the controller determines whether the clock signal is detected based on a level of the detection signal output from the comparator.

12. A power control method of a display apparatus having a power supplying part, the power control method comprising:

cutting off, by a controller, driving power to a Transition Minimized Differential Signaling (TMDS) receiving part, and switching on a switching part to monitor a clock signal line when the display apparatus enters a power-saving mode;

determining whether a clock signal is input to the display apparatus through the clock signal line;

outputting, if the clock signal is input, a detection signal related to the clock signal;

determining, in response to the output detection signal, whether the clock signal is a TMDS clock signal;

supplying, in response to determining that the clock signal is the TMDS clock signal, the driving power to the TMDS receiving part;

outputting, by the TMDS receiving part in response to the supplied driving power, a signal to the controller, determining, by the controller, whether the signal received from the TMDS receiving part is a synchronization signal; and switching, in response to the controller determining that the signal is the synchronization signal, off the switching part.

13. The power control method according to claim 12, further comprising supplying driving power to a signal processing part and a displaying part if the clock signal is determined as the TMDS clock signal.

* * * * *